(12) United States Patent
Jin et al.

(10) Patent No.: US 7,950,815 B2
(45) Date of Patent: May 31, 2011

(54) BACK LIGHT UNIT

(75) Inventors: Min Ji Jin, Suwon-si (KR); Hee Jeong Park, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 142 days.

(21) Appl. No.: 12/337,503

(22) Filed: Dec. 17, 2008

(65) Prior Publication Data

US 2009/0213571 A1 Aug. 27, 2009

(30) Foreign Application Priority Data

Feb. 22, 2008 (KR) .................. 10-2008-0016362

(51) Int. Cl.
*G09F 13/04* (2006.01)
*G09F 13/08* (2006.01)

(52) U.S. Cl. ...... 362/97.3; 362/612; 362/97.1; 362/97.2

(58) Field of Classification Search .......... 362/97.1, 362/97.2, 97.3, 612, 800; 313/498, 500, 313/79, 88, 89, 100, 98, 99; 361/600, 748, 361/805, 806, 809

See application file for complete search history.

(56) References Cited

U.S. PATENT DOCUMENTS

| | | | | |
|---|---|---|---|---|
| 6,869,812 B1 * | 3/2005 | Liu | | 438/22 |
| 6,923,548 B2 * | 8/2005 | Lim | | 362/612 |
| 7,168,841 B2 * | 1/2007 | Hsieh et al. | | 362/613 |
| 7,537,371 B2 * | 5/2009 | Okada et al. | | 362/613 |
| 7,554,625 B2 * | 6/2009 | Koganezawa | | 349/61 |
| 7,722,241 B2 * | 5/2010 | Chang | | 362/620 |
| 7,744,244 B2 * | 6/2010 | Huang | | 362/231 |
| 2006/0146563 A1 * | 7/2006 | Chen | | 362/561 |
| 2006/0164858 A1 * | 7/2006 | Park et al. | | 362/561 |
| 2006/0181866 A1 * | 8/2006 | Jung et al. | | 362/97 |
| 2006/0246617 A1 * | 11/2006 | Lee et al. | | 438/26 |
| 2007/0263384 A1 * | 11/2007 | Hsieh et al. | | 362/231 |
| 2008/0084699 A1 * | 4/2008 | Park et al. | | 362/373 |
| 2008/0191232 A1 * | 8/2008 | Lee et al. | | 257/98 |
| 2008/0278655 A1 * | 11/2008 | Moon et al. | | 349/58 |
| 2009/0180273 A1 * | 7/2009 | Kim et al. | | 362/84 |

* cited by examiner

*Primary Examiner* — Sandra L O Shea
*Assistant Examiner* — Danielle Allen
(74) *Attorney, Agent, or Firm* — Brinks Hofer Gilson & Lione

(57) ABSTRACT

A back light unit includes a bottom cover, a plurality of light source modules mounted on the bottom cover, and an optical sheet unit over the light source modules, wherein each of the light source module includes a PCB having the plurality of light source modules mounted thereon, a diffusing plate spaced a distance from the LED light sources and surrounding the PCB fully for diffusing a light incident thereon from the LED light sources throughout a surface thereof uniformly, and a diffusing plate supporter for securing the diffusing plate to the PCB, and the diffusing plate includes a flat plate portion, a side wall portion extended from opposite edges of the plate portion to the diffusing plate supporter, and a plurality of light diffusing units each projected from a surface facing the LED light source on the plate portion at a position matched to the LED light source, thereby enabling to make effective response to fabrication of thinner liquid crystal display device and improve a light uniformity, and improve light utilization efficiency to improve a luminance, and enhance mechanical reliability.

14 Claims, 17 Drawing Sheets

(7 of 17 Drawing Sheet(s) Filed in Color)

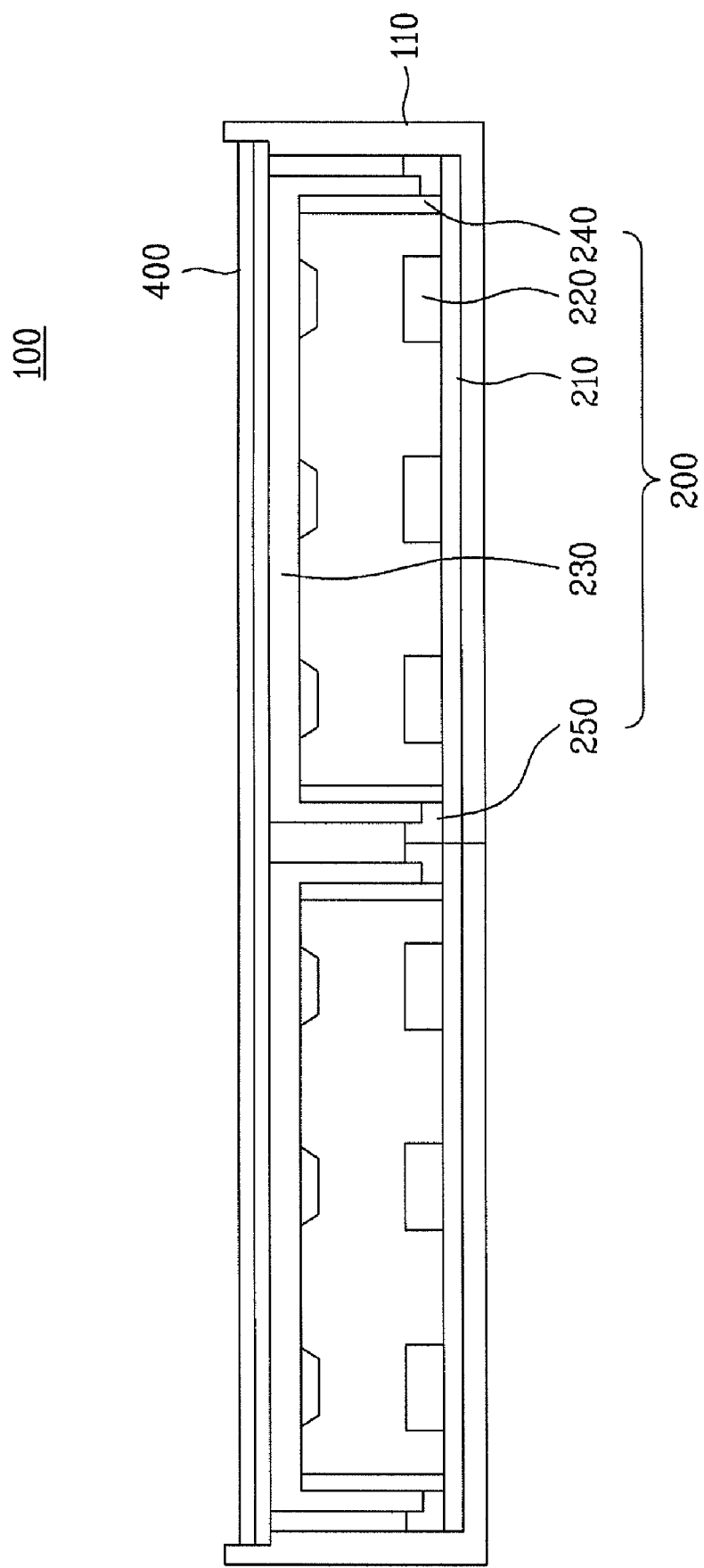

BACK LIGHT UNIT

RELATED APPLICATIONS

This application claims the benefit of the Korean Patent Application No. P2008-016362, filed on Feb. 22, 2008, which is hereby incorporated by reference as if fully set forth herein.

BACKGROUND

1. Field of the Disclosure

The present invention relates to back light units, more particularly, to a light emitting diode (LED) back light unit having a light source module with a diffusing plate which has a light diffusing unit on a surface of the diffusing plate opposite to the light source.

2. Discussion of the Related Art

As the society is developing into an information oriented society, demand on display devices is being increased in a variety of forms. In response to the increase in demand, various flat display devices such as LCD (Liquid Crystal Display), PDP (Plasma Display Panel), ELD (Electro-Luminescent Display), VFD (Vacuum Fluorescent Display) are researched and developed, and some are already being utilized today.

The liquid crystal display device is a typical flat display device, which is mostly used as mobile image display devices and other devices such as notebook computer screens, TV sets, and computers monitors, owing to its advantages of good picture quality, light weight, thin profile, and low power consumption.

However, since the liquid crystal display device cannot emit light on its own, the liquid crystal display device requires an external light source to produce a high quality picture.

Therefore, in addition to a liquid crystal display panel, the liquid crystal display device is provided with a back light unit as a light source to provide uniform supply of high luminance light to the liquid crystal display panel to produce a high quality picture.

In general, as the light source of the back light unit, a cylindrical fluorescent lamp such as CCFL (Cold Cathode Fluorescent Lamp), HCFL (Hot Cathode Fluorescent Lamp) and EEFL (External Electrode Fluorescent Lamp); LED (Light Emitting Diode) devices; or EL (Electro Luminescence) devices are mostly used. Also, the back light units are divided into an edge-lighting type and a direct-lighting type back light units, according to arrangement of the light source.

Referring to FIG. 1, the edge-lighting type back light unit 10 is provided. A light plate 11 for scattering the light to make the light uniform is provided at one side of a fluorescent lamp 12, which is the light source of the back light unit. Also, a lamp housing 13 surrounds the fluorescent lamp 12.

The light from the fluorescent lamp 12 is reflected at the lamp housing 13 and is incident on the light plate 11.

Under the light plate 11, there is located a reflective member 14, and above the light plate 11, there are located various kinds of optical sheet unit 15 such as a diffuser sheet, a prism sheet, a protective sheet, and so on.

In the edge-lighting type back light unit, the light from the fluorescent lamp 12 is incident on the light plate 11, the light plate 11 scatters and converts the light incident thereon from a linear light into a uniform planar light, and the reflective member 14 under the light plate 11 reflects the light toward an upper side of the light plate 11.

The the various kinds of optical sheet unit 15 such as the diffuser sheet, the prism sheet and so on above the light plate 11 converges, and then diffuses the light again to improve the characteristics of the light such as a luminance and uniformity, and directs the light toward the liquid crystal display panel (not shown) on an upper side of the optical sheet unit 15, thereby functioning as the back light unit.

The edge-lighting type back light, unit which spreads the light from the fluorescent lamp at an edge of the liquid crystal display panel to an entire surface by using the light plate, has a low luminance and is difficult to apply to a large sized liquid crystal display device as compared to a direct-lighting type back light unit.

On the other hand, referring to FIG. 2, the direct-lighting type back light unit 20 is provided with the various kinds of optical sheet unit 25 stacked on a diffuser plate 21, which is added with a diffusing agent for diffusing light to make the light uniform. Fluorescent lamps 22 and a reflective member 24 is provided in a space under the diffusing plate 21, covered with a cover bottom 23 of the back light unit.

The direct-lighting type back light unit having the fluorescent lamps arranged on plane under the diffusing plate has a better light efficiency than the edge-lighting type back light unit since the light from the fluorescent lamps is directed toward the liquid crystal display panel directly, and can easily be applied to a large sized liquid crystal display device. However, it is liable to shapes of the fluorescent lamps being shown on the liquid crystal display panel.

In order to prevent the shapes of the lamps being shown on the liquid crystal display panel, securing and maintaining an adequate space between the fluorescent lamps and the diffusing plate and adding the diffusing agent to the diffusing plate for uniform distribution of the light is required. As a result, a total thickness of the back light unit becomes thicker, limiting fabrication of thinner liquid crystal display devices.

That is, the requirement for securing a predetermined space between the light source and the optical sheet unit for uniform light distribution limits fabrication of thinner liquid crystal display devices.

BRIEF SUMMARY

Accordingly, the present invention is directed to a back light unit.

Additional features of the invention will be set forth in the description which follows and will become apparent to those having ordinary skill in the art upon examination of the following or may be learned from practice of the invention. Other advantages of the invention may be realized and attained by the structure particularly pointed out in the written description and claims hereof as well as the appended drawings.

A back light unit includes a bottom cover, a plurality of light source modules mounted on the bottom cover and an optical sheet unit over the light source modules, wherein each of the light source module includes a PCB having the plurality of light source modules mounted thereon, a diffusing plate spaced a distance from the LED light sources and surrounding the PCB fully for diffusing a light incident thereon from the LED light sources throughout a surface thereof uniformly, and a diffusing plate supporter for securing the diffusing plate to the PCB, and the diffusing plate includes a flat plate portion, a side wall portion extended from opposite edges of the plate portion to the diffusing plate supporter, and a plurality of light diffusing units each projected from a surface facing the LED light source on the plate portion at a position matched to the LED light source.

It is to be understood that both the foregoing general description and the following detailed description of the present invention are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are included to provide a further understanding of the invention and are incorporated in and constitute a part of this application, illustrate embodiment(s) of the invention and together with the description serve to explain the principle of the invention. In the drawings:

FIG. 3A illustrates a sectional view of a back light unit in accordance with a first embodiment of the present invention.

DETAILED DESCRIPTION OF THE DRAWINGS AND THE PRESENTLY PREFERRED EMBODIMENTS

Figure 1:
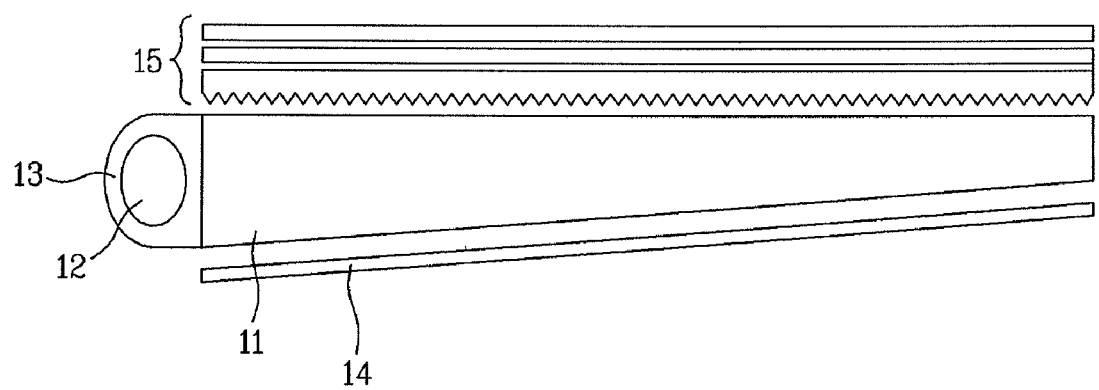
FIG. 1 illustrates a sectional view of an edge-lighting type liquid crystal display device according to the related art.
Figure 2:
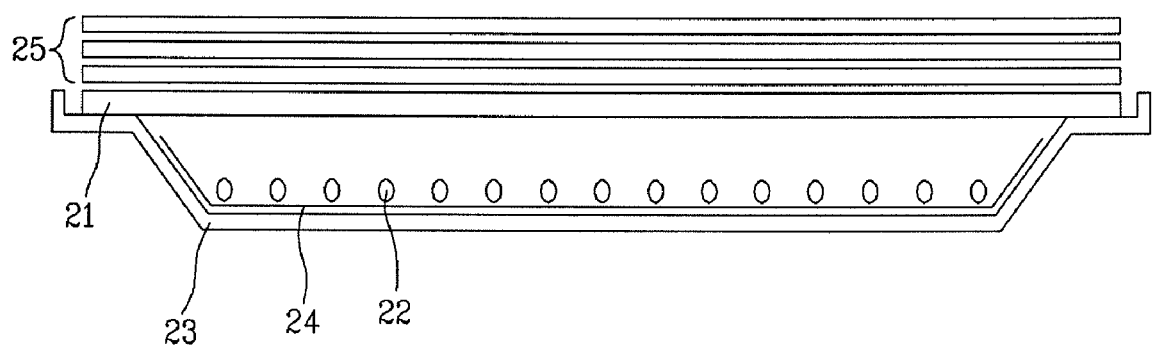
FIG. 2 illustrates a sectional view of a direct-lighting type liquid crystal display device according to the related art.

Reference will now be made in detail to the preferred embodiments of the present invention, examples of which are illustrated in the accompanying drawings. Wherever possible, the same reference numbers will be used throughout the drawings to refer to the same or like parts.

The back light unit of the present invention includes a plurality of light source modules mounted on a bottom cover and an optical sheet unit provided above the light source modules, wherein the light source module includes a PCB (Printed Circuit Board), an LED (Light Emitting Diode) light source mounted on the PCB, and a diffusing plate spaced a distance from the LED light source and surrounding the PCB fully, and the diffusing plate includes a plate portion, a side wall portion extended from opposite edges of the plate portion to a diffusing plate supporter, and a light diffusing unit projected from a surface facing the LED light source on the plate portion at a position matched to the LED light source.

A back light unit in accordance with a first embodiment of the present invention will be described with reference to the attached drawings.

FIG. 3A illustrates a sectional view of a back light unit in accordance with a first embodiment of the present invention.

Referring to FIG. 3A, the back light unit 100 includes a bottom cover 110, a plurality of light source modules 200 mounted on the bottom cover 110, and an optical sheet unit 400 provided above the optical modules 200, wherein the light source module 200 includes a PCB(Printed Circuit Board) 210, a plurality of LED light sources 220 mounted on the PCB 210, a diffusing plate 230 spaced a distance from the LED light sources 220 and surrounding the PCB 210, and a diffusing plate supporter 250 for securing the diffusing plate 230 to the PCB 210, and the diffusing plate 230 includes a plate portion, a side wall portion extended from opposite edges of the plate portion to the diffusing plate supporter 250, and a light diffusing unit projected from a surface facing the LED light source 220 on the plate portion at a position matched to the LED light source 220.

For reference, the back light unit 100 has at least two light source modules 200.

The bottom cover 110 has a box shape with an opened top for placing the light source modules 200, which will be described later herein, and is constructed of a metal having a high strength for protecting the light source modules 200 mounted therein from an external impact.

The optical sheet unit 400 includes, for an example, a diffuser sheet for scattering the light throughout an entire surface thereof uniformly, a prism sheet for refracting and converging the light to increase a luminance, and a protective sheet basically for diverging the light for enlarging an angle of view converged by the prism sheet.

Though the drawing shows two of the light source modules 200 placed close to each other, the two light source modules 200 may be placed away from each other as required.

Though not shown, the PCB 210 is connected to an external inverter for driving the PCB 210, and has a plurality of wires formed thereon for supplying signals from the inverter to the LED light sources 220.

Both a surface of the PCB 210 and a surface of the bottom cover 110 facing the surface of the PCB 210 are electrically insulated from each other.

It is preferable that the surface opposite to the diffuser plate 230 of the PCB 210 has a reflective layer or a reflective coating applied thereto.

The LED light source 220 is driven by the signals from the external inverter to emit light, and it is preferable that the LED light sources 220 mounted on the same PCB 210 are connected in series.

The LED light source 220 may be a white LED, or three colored LEDs of red, green, and blue mounted in a form of a package, or a blue LED light source having yellow, red, and green phosphor applied thereto to emit a white light on the whole.

It is preferable that the LED light source 220 is a top-view type LED which is mostly used for a direct-lighting type back light unit.

Referring to FIG. 3A, the diffusing plate 230 is arranged a distance away from the LED light sources 220, surrounds the PCB 210, and is constructed of an acryl or polycarbonate resin plate with a diffusing agent mixed therewith to have a milky white color.

The diffusing plate 230 includes a flat plate portion 232, a side wall portion 236 extended from opposite edges of the plate portion 232 to a diffusing plate supporter 250, and a plurality of light diffusing units 234 projected from a surface facing the LED light sources 220 on the plate portion 232 at positions matched to the respective LED light sources 220.

Referring to FIG. 3A, the light diffusing units 234 are projected from the surface facing the LED light sources 220 on the plate portion 232 at positions matched to the LED light sources 220, respectively.

Figure 3B:
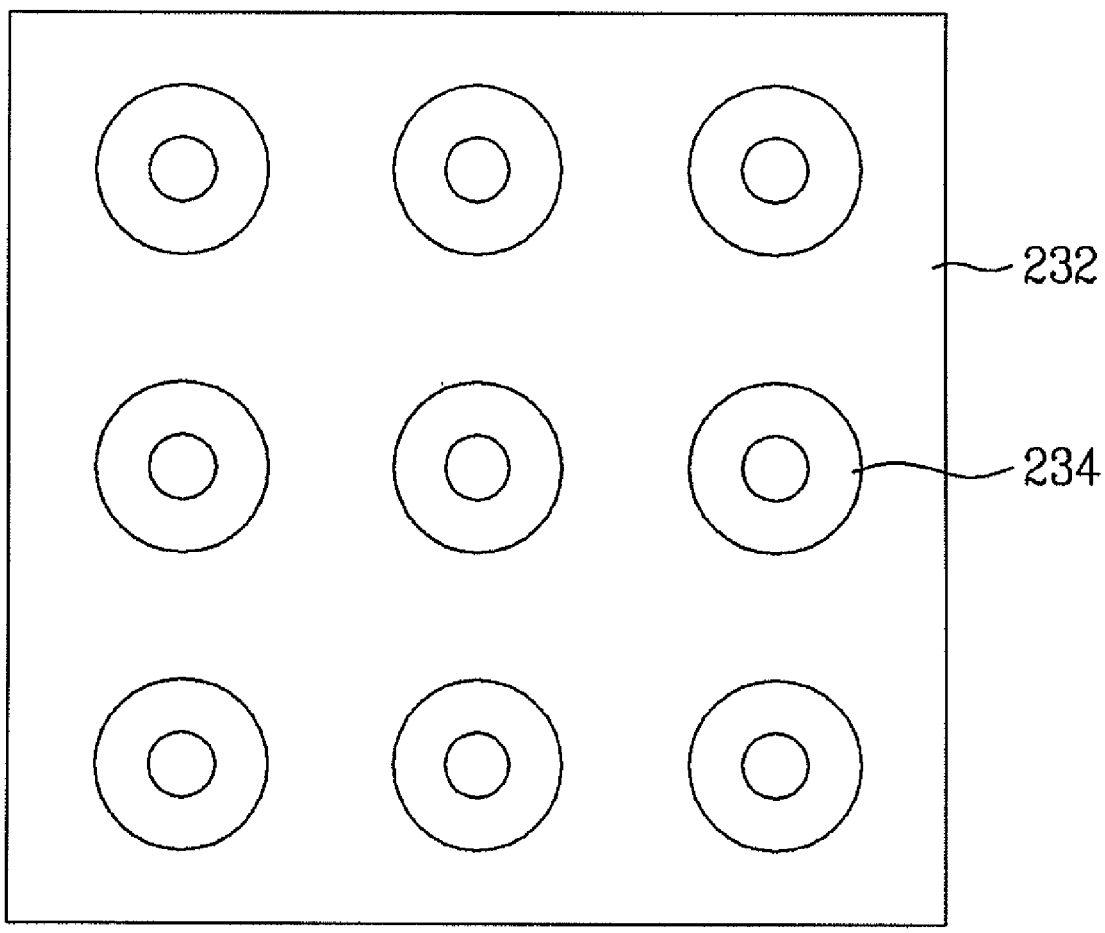
FIG. 3B illustrates a plan view of a light diffusing unit in a back light unit in accordance with a first embodiment of the present invention, showing a case when the light diffusing unit has a conical column shape.
Figure 3C:
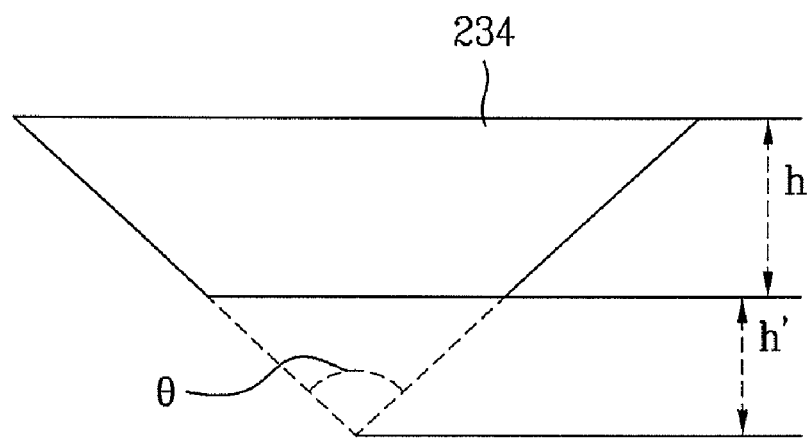
FIG. 3C illustrates a side view of a light diffusing unit in a back light unit in accordance with a first embodiment of the present invention, showing a case when the light diffusing unit has a conical column shape.
Figure 3D:
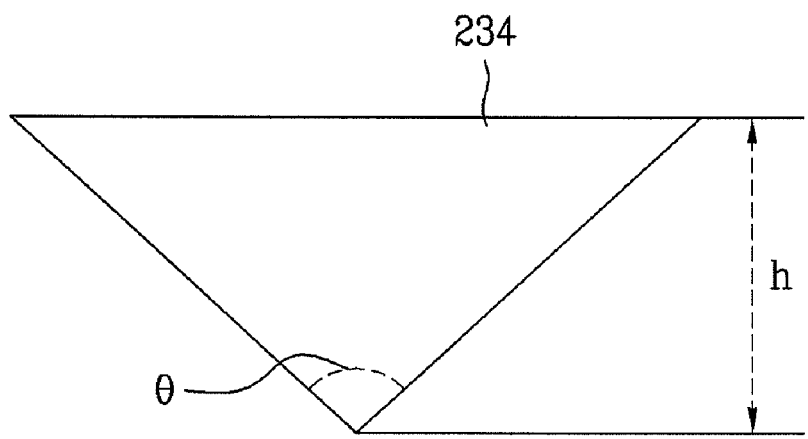
FIG. 3D illustrates a side view of a light diffusing unit in a back light unit in accordance with a first embodiment of the present invention, showing a case when the light diffusing unit has a conical shape.

FIG. 3B illustrates a plan view of a light diffusing unit 234 in a back light unit in accordance with a first embodiment of the present invention, showing a case when the light diffusing unit has a conical column shape; FIG. 3C illustrates a side view of a light diffusing unit 234 in a back light unit in accordance with a first embodiment of the present invention, showing a case when the light diffusing unit has a conical column shape; and FIG. 3D illustrates a side view of a light diffusing unit 234 in a back light unit in accordance with a first embodiment of the present invention, showing a case when the light diffusing unit has a conical shape.

Referring to FIG. 3B, the diffusing plate 230 includes a flat plate portion 232, and a plurality of light diffusing units 234 projected from a surface facing the LED light sources 220 on the plate portion 232 at positions matched to the respective LED light sources 220.

The light diffusing unit 234 may have a shape, for an example, of a circular truncated cone having a trapezoidal cross section, a circular cone, a pyramid, a truncated pyramid, an elliptical truncated cone, or a cuboid. The LED light sources 220 respectively matched to the light diffusing units 234 are not in contact with one another, but spaced away a distance.

Particularly, referring to FIG. 3C, in a case where the light diffusing unit 234 has a conical column shape, it is preferable that a height h of the conical column, a height h' of a cut away cone portion, and an apex angle θ of the conical column are optimized, and a reflective ratio and a transmission factor of the light diffusing unit 234 are also preferably optimized.

Also, referring to FIG. 3D, in a case where the light diffusing unit 234 has a circular cone shape, it is preferable that a height h of the circular cone, and an apex angle θ of the circular cone are optimized, and a reflective ratio and a transmission factor of the light diffusing unit 234 are also preferably optimized.

The light diffusing unit 234 may be formed as one unit with the plate portion 232, or attached thereto separately. The light diffusing unit 234 may be formed of a same material as the plate portion 232.

Figure 4:
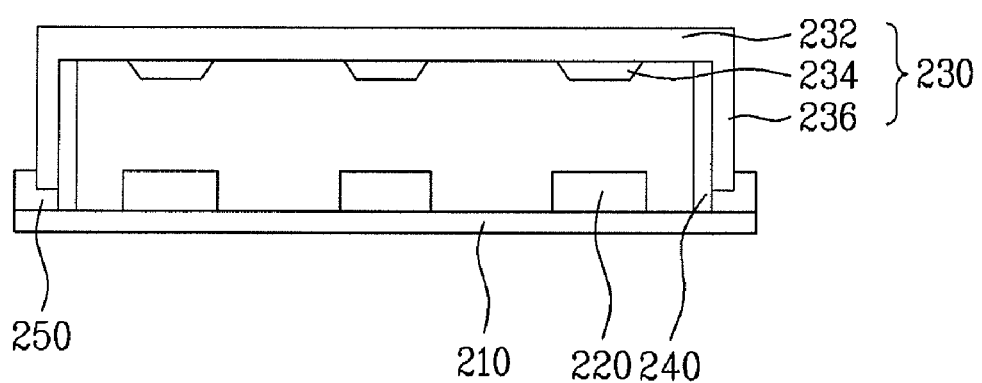
FIG. 4 illustrates an enlarged sectional view of a light source module in a back light unit in accordance with a first embodiment of the present invention.

FIG. 4 illustrates an enlarged sectional view of a light source module in a back light unit in accordance with a first embodiment of the present invention.

Referring to FIG. 4, the light source module includes a PCB 210, a plurality of LED light sources 220 mounted on the PCB 210, and a diffusing plate 230 spaced a distance from the LED light sources 220 and fully surrounding the PCB 210, and a diffusing plate supporter 250 for securing the diffusing plate 230 to the PCB 210, and may further include a reflective plate at a side wall of the diffusing plate 230.

The diffusing plate 230 is secured to the PCB 210 with the diffusing plate supporter 250 provided on the PCB 210. The diffusing plate supporter 250 secures the diffusing plate 230 with, for an example, screws.

In more detail, the diffusing plate supporter 250 has a first region having a first step, and a second region having a second step greater than the first step, wherein as the side wall of the diffusing plate 230 is secured to the second region of the diffusing plate supporter 250, the diffusing plate 230 is secured so as not to be moved by an external impact. In this instance, the first region surrounds an outside surface of the side wall of the diffusing plate 230.

Though not shown, the diffusing plate supporter 250 is secured to the PCB 210 by an SMT process.

It is preferable that the reflective plate 240 on the side wall of the diffusing plate 230 has a height smaller than a distance from the PCB 210 to the plate portion 232 to expose a portion of the wide wall of the diffusing plate 230.

Because the back light unit 100 includes the light source modules 200 having the diffusing plate 230 with the light diffusing unit 234, the liquid crystal display device can be fabricated slimmer effectively.

That is, in a back light unit with general LED light sources of the related art, since the LED light source has a Lambertian Distribution in which the LED light source has a uniform light distribution at all angles, ability to reduce a thickness of the back light unit is limited.

However, the back light unit in accordance with the first embodiment of the present invention enables to effectively fabricate the liquid crystal display device slimmer by means of the light diffusing unit 234 formed at the diffusing plate 230.

Moreover, the back light unit in accordance with the first embodiment of the present invention can direct a uniform light to an entire surface of the liquid crystal display panel, and minimize unnecessary loss of light, thereby improving luminance.

The securing of the diffusing plate 230 to the PCB 210 with the diffusing plate supporter 250 allows, not only to improve mechanical reliability that has been a problem in the related art in which a light guiding plate is used, but also to fabricate a variety of liquid crystal display devices with minimum cost by adjusting a distance between adjacent light source modules 200 or a distance between the LED light sources 220 in the light source module 200.

A back light unit in accordance with a second embodiment of the present invention will be described with reference to the attached drawings.

Figure 5:
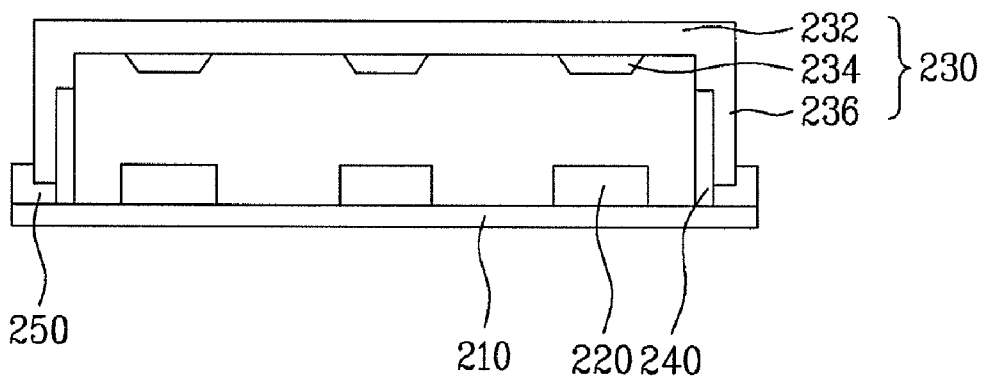
FIG. 5 illustrates a sectional view of a light source module in a back light unit in accordance with a second embodiment of the present invention.

FIG. 5 illustrates a sectional view of a light source module in a back light unit in accordance with a second embodiment of the present invention.

Referring to FIG. 5, the back light unit includes a bottom cover 110, a plurality of light source modules 200 mounted on the bottom cover 110, and an optical sheet unit 400 provided above the optical modules 200, wherein the light source module 200 includes a PCB 210, a plurality of LED light sources 220 mounted on the PCB 210, a diffusing plate 230 spaced a distance from the LED light sources 220 and fully surrounding the PCB 210, a diffusing plate supporter 250 for securing the diffusing plate 230 to the PCB 210, and a reflective plate 240 at a side of the diffusing plate 230, and the diffusing plate 230 includes a plate portion 232, a side wall portion 236 extended from opposite edges of the plate portion 232 to the diffusing plate supporter 250, and an light diffusing unit 234 projected from a surface facing the LED light source 220 on the plate portion 232 at a position matched to the LED light source 220. The reflective plate 240 is placed in a recess in the side wall of the diffusing plate 230.

Since the back light unit in accordance with the second embodiment of the present invention is identical to the first embodiment thereof except that the reflective plate 240 is placed in the recess in the side wall of the diffusing plate 230, detailed description of other portions of the back light unit in accordance with the second embodiment of the present invention will be omitted.

Thus, placing the reflective plate 240 in the side wall of the diffusing plate 230 which is spaced from the LED light sources 220 and surrounds the PCB 210 prevents the reflective plate 240 from interfering with the diffusing plate 230 when the diffusing plate 230 is secured to the diffusing plate supporter 250.

A back light unit in accordance with a third embodiment of the present invention will be described with reference to the attached drawings.

Figure 6:
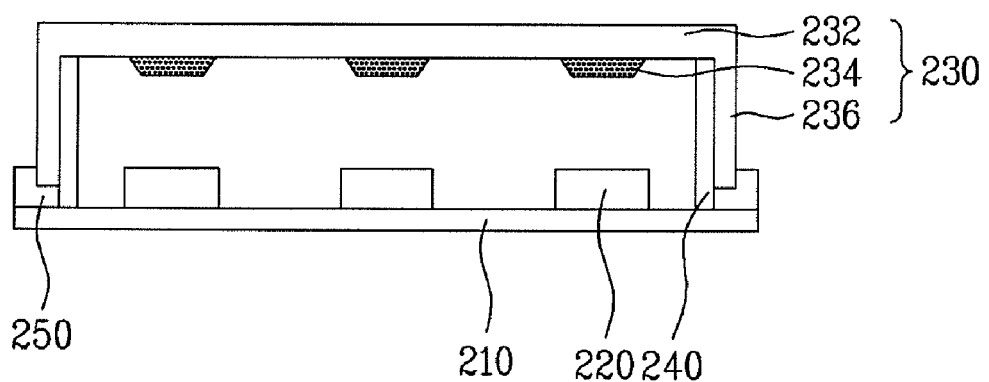
FIG. 6 illustrates a sectional view of a light source module in a back light unit in accordance with a third embodiment of the present invention.

FIG. 6 illustrates a sectional view of a light source module in a back light unit in accordance with the third embodiment of the present invention.

Referring to FIG. 6, the back light unit includes a bottom cover 110, a plurality of light source modules 200 mounted on the bottom cover 110, and an optical sheet unit 400 over the light source modules 200, wherein the light source module 200 includes a PCB 210, a plurality of LED light sources 220 mounted on the PCB 210, a diffusing plate 230 spaced a distance from the LED light sources 220 and surrounding the PCB 210 fully, a diffusing plate supporter 250 for securing the diffusing plate 230 to the PCB 210, and a reflective plate 240 at a side of the diffusing plate 230, and the diffusing plate 230 includes a plate portion 232, a side wall portion 236 extended from opposite edges of the plate portion 232 to the diffusing plate supporter 250, and a light diffusing unit 234 projected from a surface facing the LED light source 220 on the plate portion 232 at a position matched to the LED light source 220. The light diffusing unit 234 is formed of a material different from a material of the plate portion 232, and it is preferable that the material of the light diffusing unit 234 has a refractive index lower than that of the material of the plate portion 232.

Since the back light unit in accordance with the third embodiment of the present invention is identical to the first embodiment thereof except that the material of the light diffusing unit 234 is different from the material of the plate portion 232, detailed description of other portions of the back light unit in accordance with the third preferred embodiment of the present invention will be omitted.

Thus, the formation of the light diffusing unit 234 of the diffusing plate 230 with a material different from the material of the plate portion 232, specifically, with the material of the light diffusing unit 234 having a refractive index lower than that of the material of the plate portion 232, permits to increase a light diffusing efficiency.

A back light unit in accordance with a fourth embodiment of the present invention will be described with reference to the attached drawing.

Figure 7:
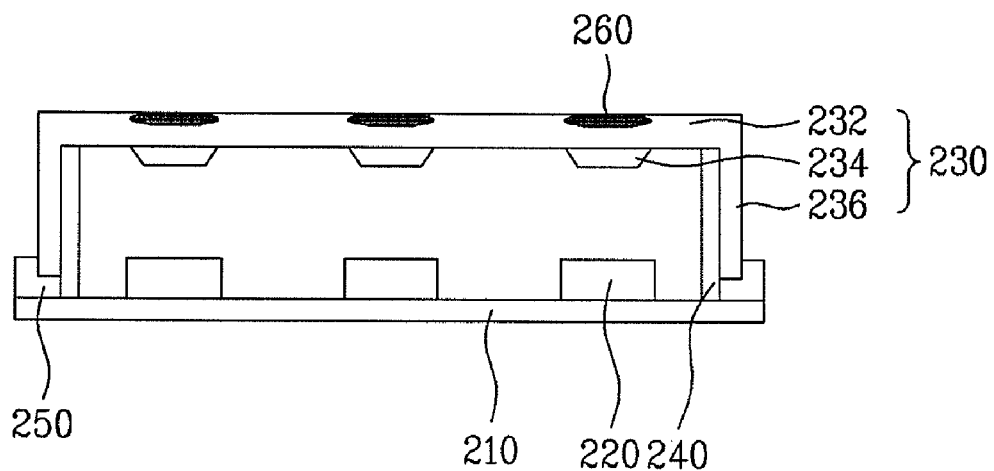
FIG. 7 illustrates a sectional view of a light source module in a back light unit in accordance with a fourth embodiment of the present invention.

FIG. 7 illustrates a sectional view of a light source module in a back light unit in accordance with the fourth embodiment of the present invention.

Referring to FIG. 7, the back light unit includes a bottom cover 110, a plurality of light source modules 200 mounted on the bottom cover 110, and an optical sheet unit 400 over the light source modules 200, wherein the light source module 200 includes a PCB 210, a plurality of LED light sources 220 mounted on the PCB 210, a diffusing plate 230 spaced a distance from the LED light sources 220 and surrounding the PCB 210 fully, a diffusing plate supporter 250 for securing the diffusing plate 230 to the PCB 210, and a reflective plate 240 at a side of the diffusing plate 230, and the diffusing plate 230 includes a plate portion 232, a side wall portion 236 extended from opposite edges of the plate portion 232 to the diffusing plate supporter 250, an light diffusing unit 234 projected from a surface facing the LED light source 220 on the plate portion 232 at a position matched to the LED light source 220, and an optical pattern 260 on a surface of the plate portion 232 opposite to the light diffusing unit 234 at a position matched to the light diffusing unit 234.

Since the back light unit in accordance with the fourth embodiment of the present invention is identical to the first embodiment thereof except that the optical pattern 260 is formed on a surface of the plate portion 232 opposite to the light diffusing unit 234 at a position matched to the light diffusing unit, detailed description of other portions of the back light unit in accordance with the fourth embodiment of the present invention will be omitted.

Thus, the formation of the optical pattern 260 on a surface of the plate portion 232 opposite to the light diffusing unit 234 at a position matched to the light diffusing unit 234 enables to increase a light diffusing efficiency, or light utilization efficiency, and prevent a white spot from occurring above the LED light source 220.

A back light unit in accordance with a fifth embodiment of the present invention will be described with reference to FIGS. 8A and 8B.

Figure 8A:
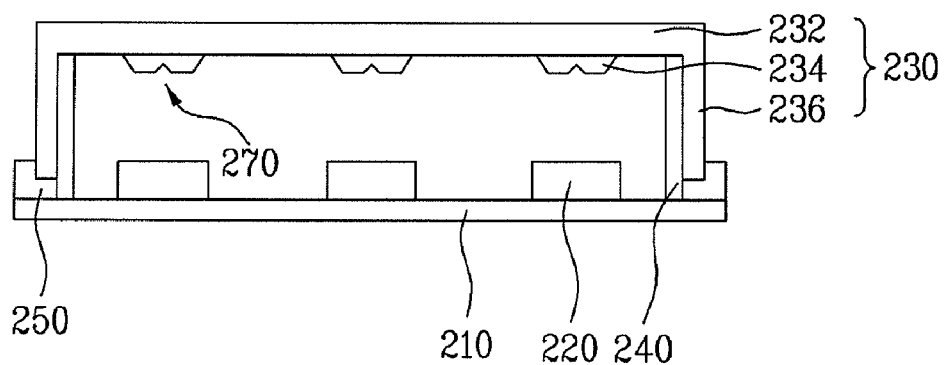
FIG. 8A illustrates a sectional view of a light source module in a back light unit in accordance with a fifth embodiment of the present invention.
Figure 8B:
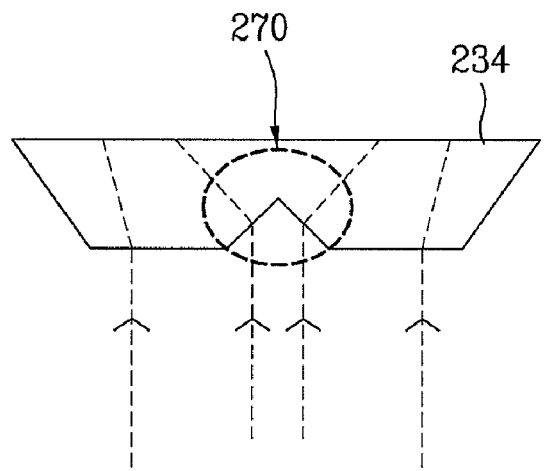
FIG. 8B illustrates an enlarged side view of a light diffusing unit in a back light unit in accordance with a fifth embodiment of the present invention.

FIG. 8A illustrates a sectional view of a light source module in a back light unit in accordance with the fifth embodiment of the present invention, and FIG. 8B illustrates an enlarged side view of a light diffusing unit in a back light unit in accordance with a fifth embodiment of the present invention.

Referring to FIG. 8A, the back light unit includes a bottom cover 110, a plurality of light source modules 200 mounted on the bottom cover 110, and an optical sheet unit 400 over the light source modules 200, wherein the light source module 200 includes a PCB 210, a plurality of LED light sources 220 mounted on the PCB 210, a diffusing plate 230 spaced a distance from the LED light sources 220 and surrounding the PCB 210 fully, a diffusing plate supporter 250 for securing the diffusing plate 230 to the PCB 210, and a reflective plate 240 at a side of the diffusing plate 230, and the diffusing plate 230 includes a plate portion 232, a side wall portion 236 extended from opposite edges of the plate portion 232 to the diffusing plate supporter 250, an light diffusing unit 234 projected from a surface facing the LED light source 220 on the plate portion 232 at a position matched to the LED light source 220, and an optical pattern 270 of the light diffusing unit 234 is positioned to correspond to the LED light source 220.

Since the back light unit in accordance with the fifth embodiment of the present invention is identical to the first embodiment thereof except that the optical pattern 270 is formed at the light diffusing unit 234 at a position matched to the LED light source 220, detailed description of other portions of the back light unit in accordance with the fifth embodiment of the present invention will be omitted.

Thus, the formation of the optical pattern at the light diffusing unit 234 at a position matched to the LED light source 220 enables to increase light diffusing efficiency, or light utilization efficiency.

Especially, referring to FIG. 8B, a wedge shaped optical pattern 270 is favorable for diffusing the light incident thereon, and a single or a plurality of wedge shaped pattern 270 may be formed.

A back light unit in accordance with a sixth embodiment of the present invention will be described with reference to FIG. 9.

Figure 9:
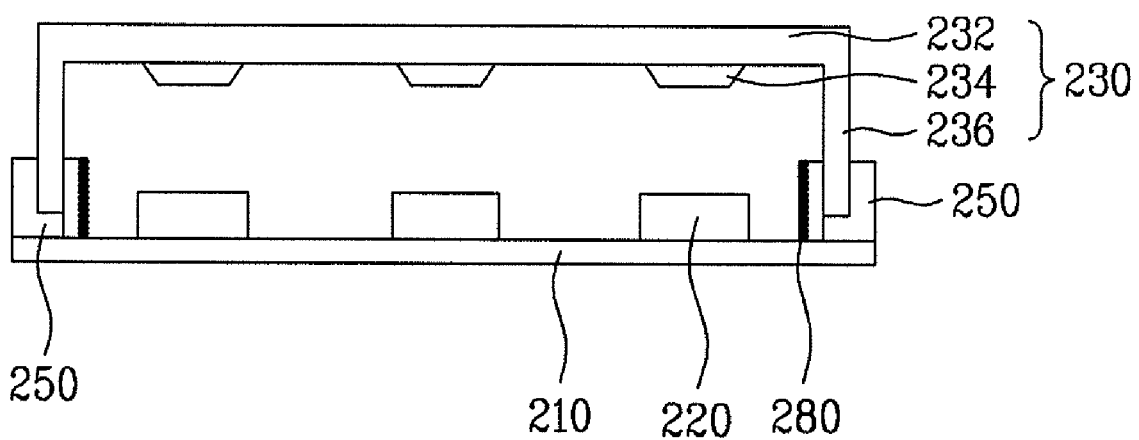
FIG. 9 illustrates a sectional view of a light source module in a back light unit in accordance with a sixth embodiment of the present invention.

FIG. 9 illustrates a sectional view of a light source module in a back light unit in accordance with a sixth embodiment of the present invention.

Referring to FIG. 9, the back light unit includes a bottom cover 110, a plurality of light source modules 200 mounted on the bottom cover 110, and an optical sheet unit 400 over the light source modules 220, wherein the light source module 200 includes a PCB 210, a plurality of LED light sources 220 mounted on the PCB 210, a diffusing plate 230 spaced a distance from the LED light sources 220 and surrounding the PCB 210 fully, and a diffusing plate supporter 250 for securing the diffusing plate 230 to the PCB 210, and the diffusing plate 230 includes a plate portion 232, a side wall portion 236 extended from opposite edges of the plate portion 232 to the diffusing plate supporter 250, an light diffusing unit 234 projected from a surface facing the LED light source 220 on the plate portion 232 at a position matched to the LED light source 220, and a reflective layer 280 formed on a surface of the diffusing plate supporter 250 adjacent to the LED light source 220.

In detail, the diffusing plate supporter 250 has a concave surface into which the side wall of the diffusing plate 230 is inserted and secured.

The reflective layer 280 on an inside surface of the diffusing plate supporter 250 adjacent to the LED light source 220 may be a coating of a reflective material applied thereon.

Since the back light unit in accordance with the sixth embodiment of the present invention is identical to the first embodiment thereof except that the reflective layer 280 is formed on an inside surface of the diffusing plate supporter 250, which secures the diffusing plate 230 to the PCB 210, i.e., adjacent to the LED light source 220, without additionally providing the reflective plate 240, detailed description of other portions of the back light unit in accordance with the sixth embodiment of the present invention will be omitted.

Thus, the formation of the reflective layer 280 on an inside surface of the diffusing plate supporter 250 adjacent to the LED light source 220 without additionally providing the reflective plate 240 permits the back light unit to have a simple structure to prevent mechanical interference.

A process for deriving an optimum light diffusing arrangement from simulations with different kinds of light diffusing unit 234 in the back light unit of the present invention will be described in more detail.

Figure 10A:
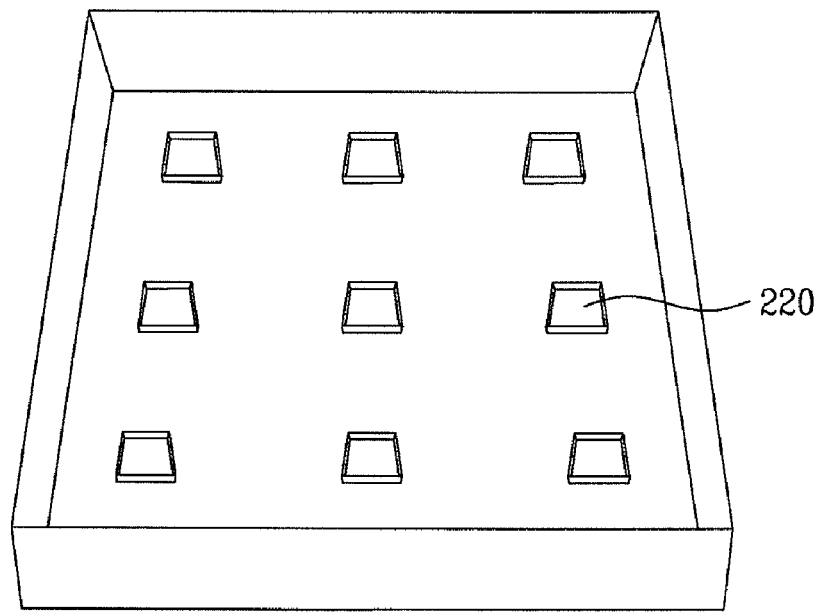
FIG. 10A illustrates a cut away perspective view of a light source module in a simulation for deriving an optimum shape of the light diffusing unit.

FIG. 10A illustrates a cut away perspective view of a light source module in a simulation for deriving an optimum arrangement of the light diffusing unit, having an upper portion of the diffusing plate removed from the light source module, showing a light source module of size 51 mm×51 mm including 9 LED light sources 220 spaced 17 mm from each other, each with a height of 1 mm, and a 2 mm thick PC9391 (Teijin) diffusing plate.

Figure 10B:
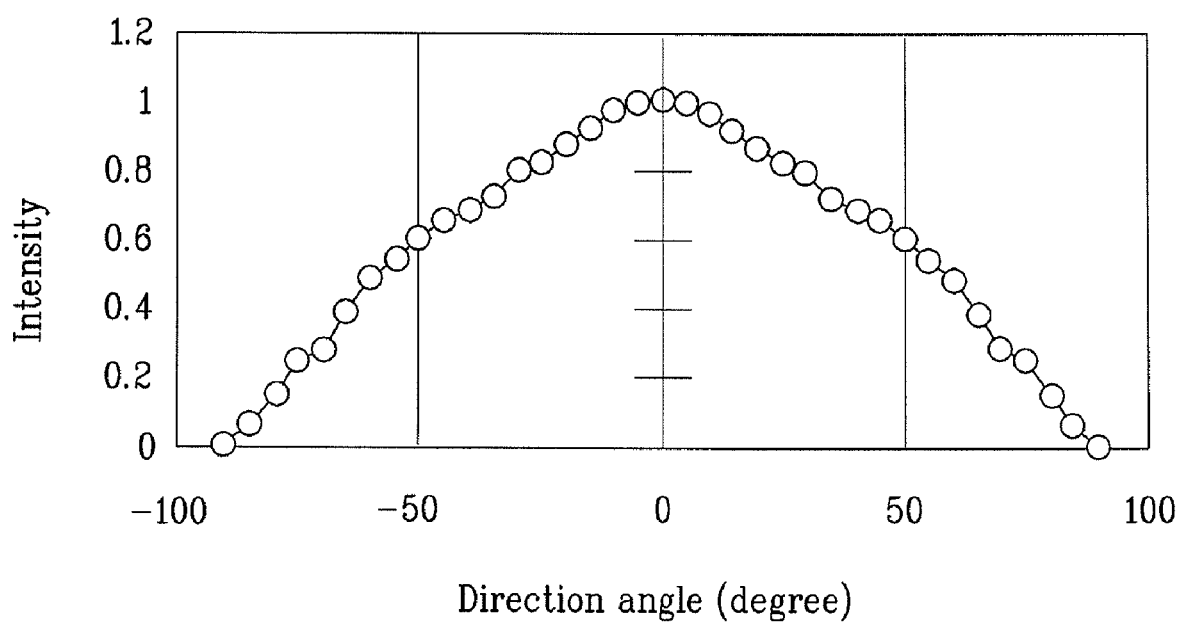
FIG. 10B illustrates a profile of an LED light source in a simulation for deriving an optimum shape of the light diffusing unit.

FIG. 10B illustrates a light profile of the LED light source.

Figure 11A:
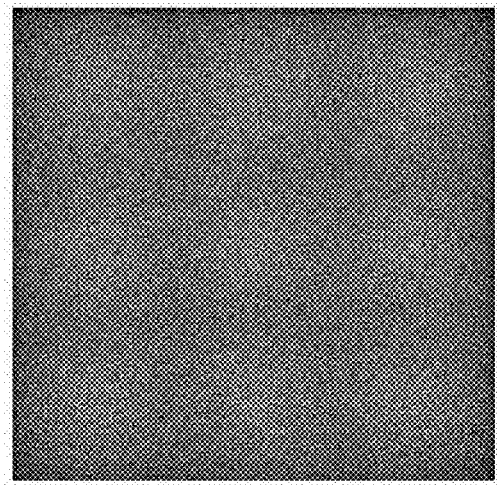
FIGS. 11A to 11K illustrate results of simulations under various conditions for deriving an optimum shape of a light diffusing unit.
Figure 11B:
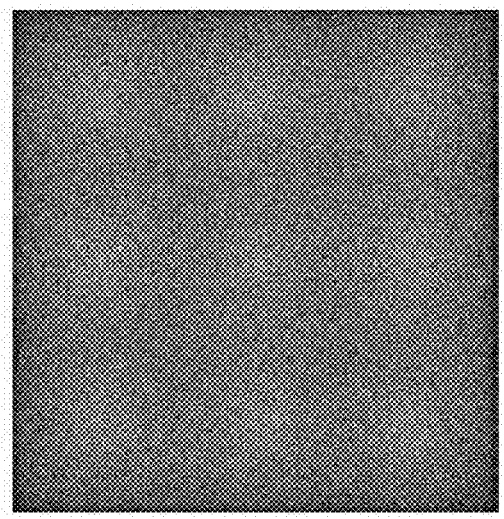
Figure 11C:
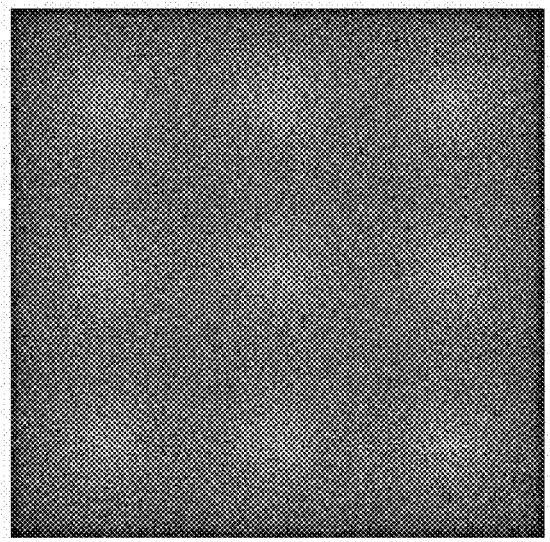

FIG. 11A illustrates a result of simulation in a case there is no light diffusing unit, FIG. 11B illustrates a result of simulation in a case the light diffusing unit has a circular cone shape with 3 mm height and an apex angle of 120°, and FIG. 11C illustrates a result of simulation in a case the light diffusing unit in FIG. 11B has a surface with a reflection factor of 50% and a transmission factor of 50%.

Figure 11D:
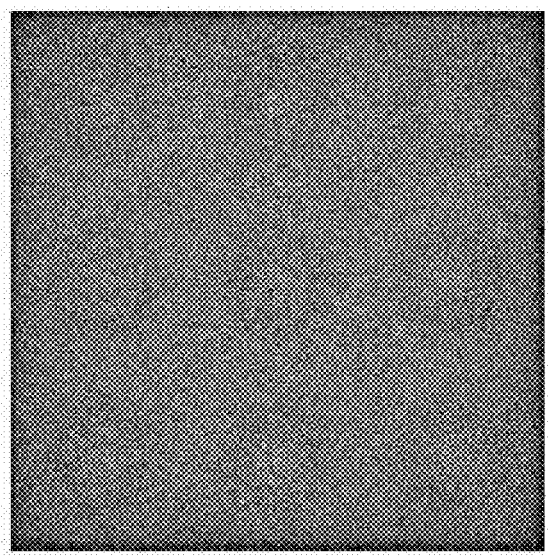
Figure 11E:
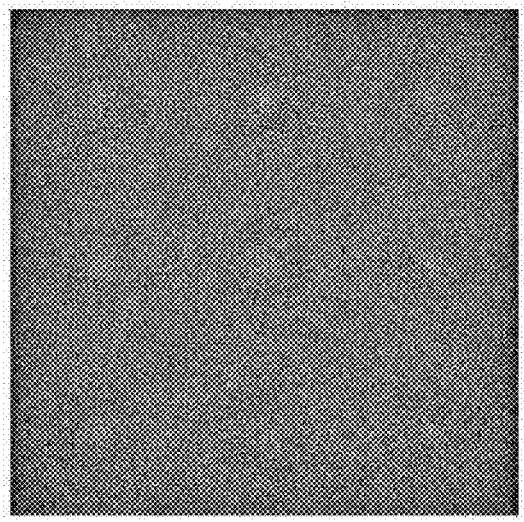
Figure 11F:
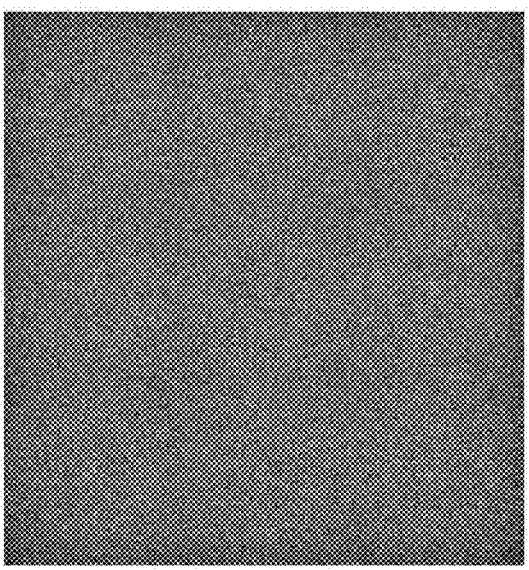

FIG. 11D illustrates a result of simulation in a case the light diffusing unit in FIG. 11B has a surface with a reflection factor of 70% and a transmission factor of 30%, FIG. 11E illustrates a result of simulation in a case the light diffusing unit has a circular cone shape with 4 mm height and an apex angle of 95°, and a surface with a reflection factor of 70% and a transmission factor of 30%, and FIG. 11F illustrates a result of simulation in a case the light diffusing unit in FIG. 11E has a circular cone shape with 3 mm height.

Figure 11G:
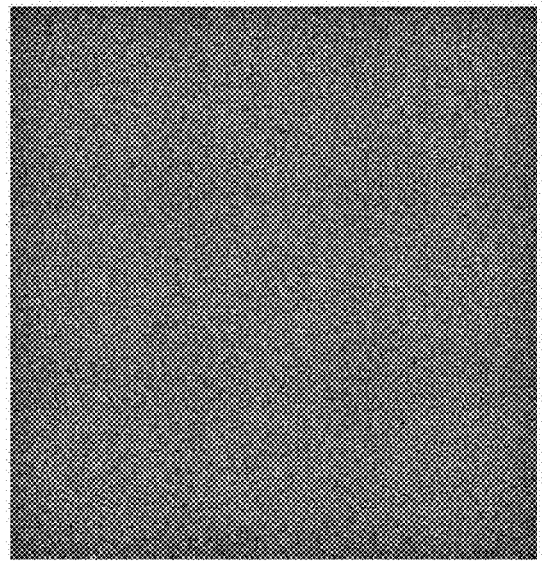
Figure 11H:
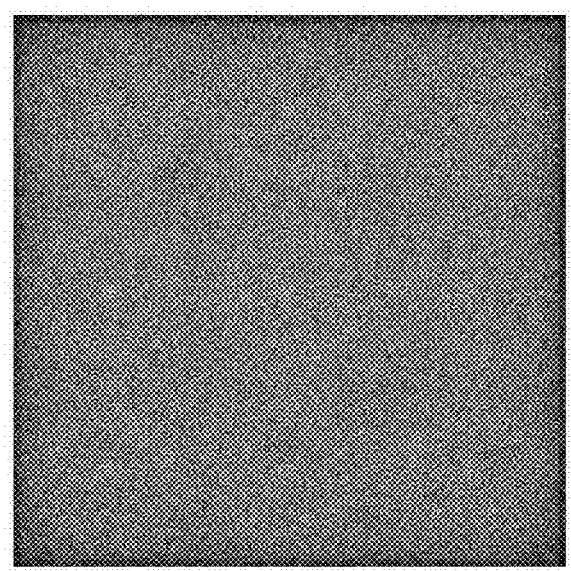

FIG. 11G illustrates a result of simulation in a case the light diffusing unit has a circular cone shape with 3 mm height and an apex angle of 90°, and a surface with a reflection factor of 70% and a transmission factor of 30%, and FIG. 11H illustrates a result of simulation in a case the light diffusing unit has a circular cone shape with 3 mm height and an apex angle of 100°, and a surface with a reflection factor of 70% and a transmission factor of 30%.

Figure 11I:
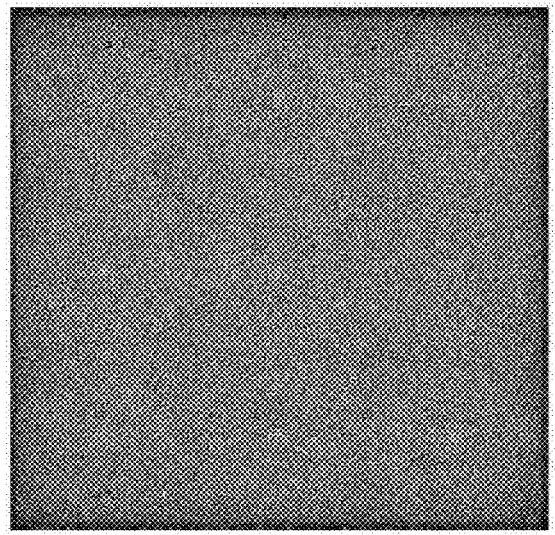
Figure 11J:
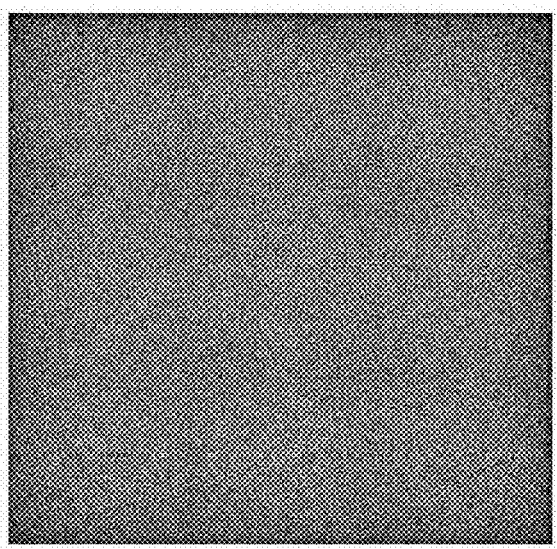
Figure 11K:
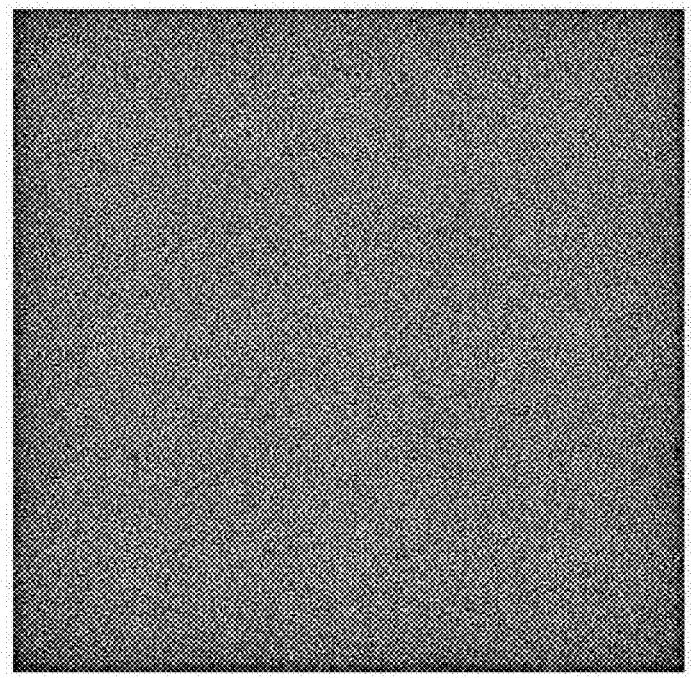

FIG. 11I illustrates a result of simulation in a case the light diffusing unit has a circular truncated cone shape with 2 mm height with a cut-off height of 1 mm and an apex angle of 100°, and a surface with a reflection factor of 70% and a transmission factor of 30%, FIG. 11J illustrates a result of simulation in a case the light diffusing unit in FIG. 11I has a surface with a reflection factor of 30% and a transmission factor of 70%, and FIG. 11K illustrates a result of simulation in a case the light diffusing unit has a circular truncated cone shape with 2 mm height with a cut-off height of 2 mm and an apex angle of 100°, and a surface with a reflection factor of 30% and a transmission factor of 70%.

Referring to FIGS. 11A to 11K, it can be known that FIG. 11A shows clear white spots due to a low height of the light source module, and FIG. 11B shows a poor overall uniformity of light diffusion in which the light diffusing unit is formed of a material the same with the plate portion.

It can also be known that FIG. 11C shows clearer white spots to the contrary, and FIG. 11D shows a donut-shaped dark portion formed around the light diffusing unit.

It can also be known that FIG. 11E also shows clearer white spots, and FIGS. 11F and 11G shows a doughnut-shaped dark portion formed around the light diffusing unit.

It can also be known that FIG. 11I shows black spots formed at the light diffusing unit, and FIG. 11J shows an improved light uniformity even though a dark spots of grating shape are formed.

It can also be known that FIG. 11H shows a good light uniformity although slight white spots are formed at the light diffusing unit, and FIG. 11K also shows a improved light uniformity.

In summary of above results, it is preferable that the light diffusing unit 234 has a circular cone shape with an apex angle of 100° and height of 3 mm, or a circular truncated cone shape with an apex angle of 100°, height of 2 mm and a 2 mm cut away portion.

A simulation process for deriving an optimum height of the reflective plate in the back light unit of the present invention will be described in more detail.

Two light source modules are used in the simulation, wherein a distance between the light source modules is 2 mm, each of the light source modules has 9 LED light sources, a distance between the LED light sources is 17 mm, height of each of the LED light sources is 1 mm, the diffusing plate of PC9391 (Teijin) has a thickness of 2 mm, and an overall size of the light source module is 51 mm×51 mm.

Figure 12A:
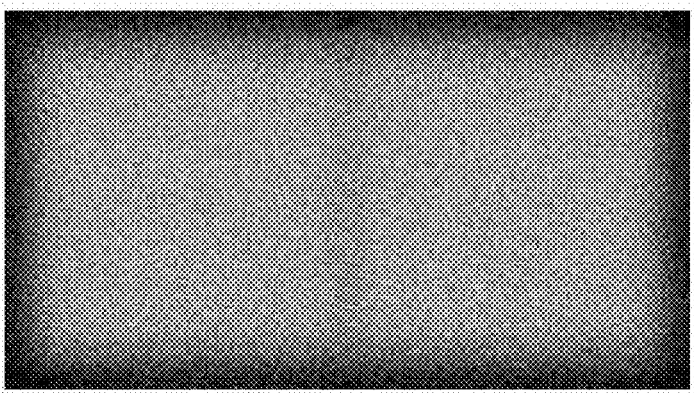
FIGS. 12A and 12B illustrate diagrams showing simulation conditions for deriving an optimum height of a light reflective plate.
Figure 12B:
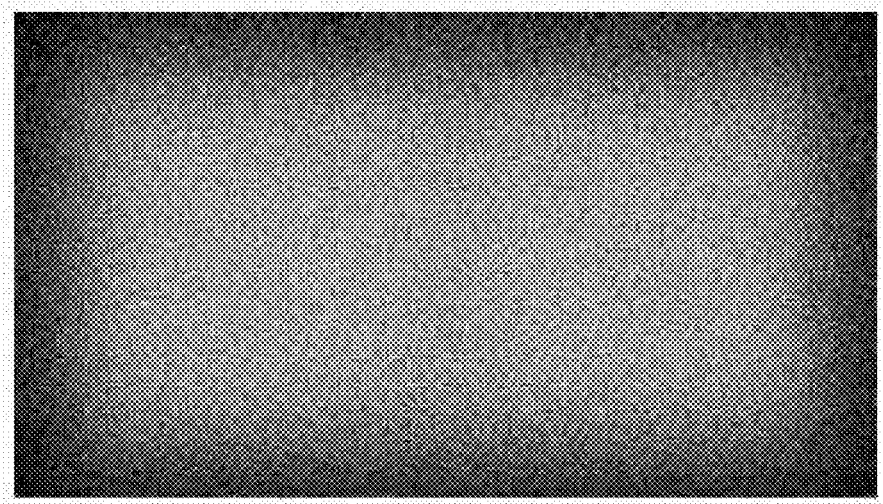

FIG. 12A illustrates a simulation result in a case where a reflective plate has a height the same as a height of the side wall, and FIG. 12B illustrates a simulation result in a case where the reflective plate has a height ⅔ of the side wall.

Referring to FIGS. 12A and 12B, it can be known that, while straight line shaped dark portions form if the reflective plate has a height the same with a height of the side wall, if the reflective plate has a height ⅔ of the side wall, the light uniformity is improved.

Figure 13:
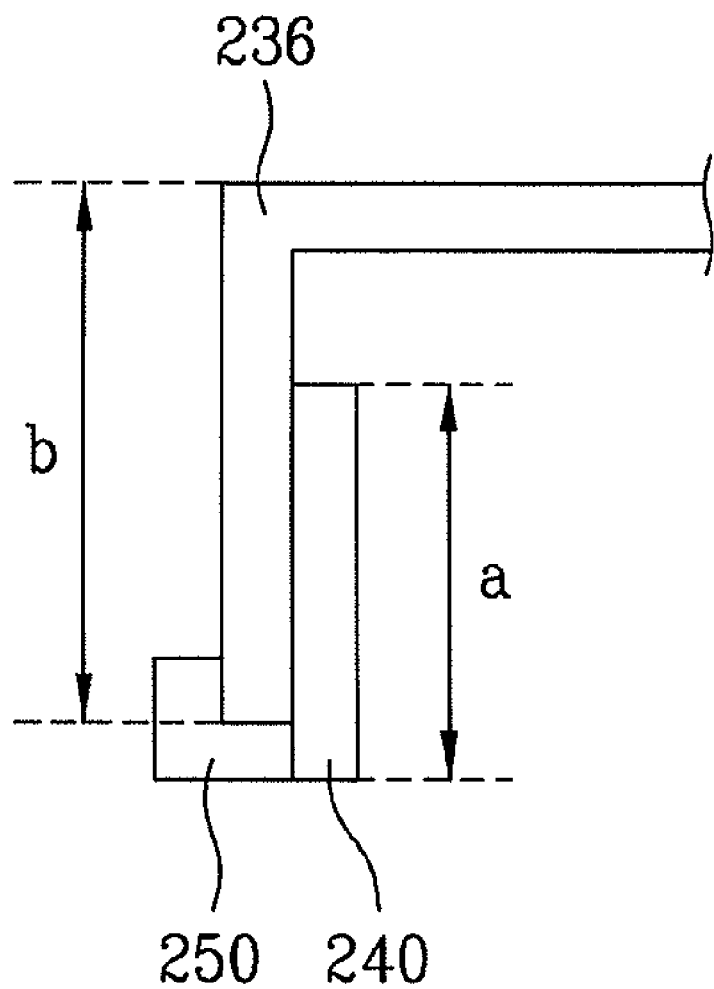
FIG. 13 illustrates a diagram of a case when a height of a reflective plate is ⅔ of a height of a side wall of a diffusing plate.

In summary of above results, referring to FIG. 13, it can be known that it is preferable that the reflective plate 240 on the side wall of the diffusing plate 236 has a height a, ⅔ of the height b of the side wall of the diffusing plate 230.

Also, combinations of features of the embodiments of the present invention may also be viable.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As has been described, the back light unit of the present invention has the following advantages.

The back light unit of the present invention permits to a fabrication of thinner liquid crystal display device and improve a light uniformity.

The back light unit of the present invention also improves light utilization efficiency to improve a luminance, and enhance mechanical reliability.

The invention claimed is:

1. A back light unit comprising:
a bottom cover;
a plurality of light source modules mounted on the bottom cover; and
an optical sheet unit provided above the light source modules;
wherein each of the light source module includes:
a PCB (Printed Circuit Board) having a plurality of LED (Light Emitting Diode) light sources mounted thereon,
a diffusing plate spaced a distance from the LED light sources and surrounding the PCB, wherein the diffusing plate diffuses a light incident thereon from the LED light sources throughout a surface thereof uniformly, and
a diffusing plate supporter that secures the diffusing plate to the PCB,
wherein the diffusing plate includes:
a flat plate portion,
a side wall portion extended from opposite edges of the plate portion to the diffusing plate supporter, and
a plurality of light diffusing units formed on an inner surface of the flat plate portion at a position matched to the plurality of the LED light source;
wherein each diffusing unit faces each LED light source;
wherein each diffusing unit is projected from the inner surface towards each LED light source.

2. The back light unit as claimed in claim 1, wherein the light source module further includes a reflective plate mounted to the side wall portion of the diffusing plate.

3. The back light unit as claimed in claim 2, wherein the reflective plate has a height shorter than a height of the side wall portion of the diffusing plate.

4. The back light unit as claimed in claim 3, wherein the reflective plate has a height which is ⅔ of a height of the side wall portion of the diffusing plate.

5. The back light unit as claimed in claim 2, wherein the reflective plate is formed in a recess of the side wall portion of the diffusing plate.

6. The back light unit as claimed in claim 1, wherein the light diffusing unit is formed of a material different from a material of the plate portion.

7. The back light unit as claimed in claim 1, wherein the light diffusing unit is formed as one unit with the plate portion.

8. The back light unit as claimed in claim 6, wherein the light diffusing unit is formed of a material having a refractive index lower than a refractive index of the plate portion.

9. The back light unit as claimed in claim 1, wherein the light diffusing unit has one of shapes selected from the group consisting of a circular cone, a pyramid, a circular truncated cone, a truncated pyramid and an elliptical truncated cone.

10. The back light unit as claimed in claim 1, wherein the plate portion includes an optical pattern formed on an outer surface opposite to the inner surface having the light diffusing unit formed thereon at position matched to the light diffusing unit.

11. The back light unit as claimed in claim 1, wherein the light diffusing unit includes an optical pattern formed at a portion of the light diffusing unit opposite to the LED light source.

12. The back light unit as claimed in claim 11, wherein the light pattern has a wedge shape.

13. The back light unit as claimed in claim 2, wherein the diffusing plate supporter includes;
a recess for placing the side wall portion of the diffusing plate therein, and
a reflective layer formed on an inside surface of the diffusing plate supporter adjacent to the LED light source.

14. The back light unit as claimed in claim 1, wherein the light source module includes a reflective layer formed on a surface of the PCB opposite to the diffusing plate.

* * * * *